3,037,912
PRODUCTION OF 1,4-PREGNADIENES BY BACTERIAL FERMENTATION
Louis I. Feldman, Spring Valley, N.Y., Neil E. Rigler, Ridgewood, N.J., and Anthony J. Shay and Barbara E. Nielsen, Pearl River, N.Y., assignors to American Cyanamid Company, New York, N.Y., a corporation of Maine
No Drawing. Filed May 6, 1960, Ser. No. 27,246
8 Claims. (Cl. 195—51)

This invention relates to the dehydrogenation of steroids. More particularly, it is concerned with a novel method of dehydrogenating certain $\Delta^4$-steroids of the pregnene series by means of microbiological fermentation, whereby a double bond is introduced in the 1,2-position.

A number of steroids of the pregnadiene series, such as 1-dehydrohydrocortisone, for example, are becoming increasingly important either as therapeutic agents or as intermediates in the preparation of other therapeutically useful steroids. Such compounds, which are obtained by the practice of the present invention, are useful as antiflammatory agents in the treatment of arthritis, asthma, burns, bursitis, and the like, and also in the treatment of skin disorders and collagen diseases. As such these compounds are used in combination with fillers, excipients, etc., in tablets, powders, pills, etc. They can also be used parenterally in a solution or in a suspension.

In accordance with the present invention, it has been found that 9α-fluoro-1,4-pregnadiene-11β,16α,17α-triol-3,20-dione or its 16-acetate can be prepared by the use of microbiological fermentation to accomplish the desired dehydrogenation in ring A of such steroids. Suitable bacterial agents for the present process include *Bacterium havaniensis* and *Bacterium mycoides*. The reaction obtained in the process of the present invention can be illustrated, for example, in the following equation:

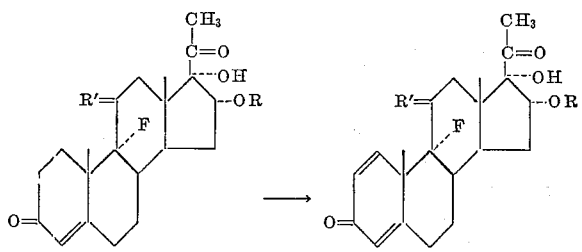

in which R is hydrogen or a lower alkanoyl radical and R' is oxygen or hydrogen and hydroxyl.

In carrying out the process of the present invention, the organism is cultivated aerobically in a suitable nutrient medium with a $\Delta^4$-steroid of the pregnene series. During the growth of the organism under favorable conditions, two hydrogen atoms are eliminated from steroid ring A and a double bond is thereby obtained in the 1,2-position. The exact mechanism of this dehydrogenation is not wholly certain. It is known to be caused by enzymes produced by the organism in the process of the growth.

A suitable nutrient medium contains a soluble source of carbon, nitrogen, and mineral elements. In general, the preparation of such media is well known and the practice of the present invention in this respect may follow such procedures.

Illustrative sources of carbon include sugars, such for example as glucose, sucrose, maltose, dextrose, xylose, gelactose, and the like; alcohols, such as glycerol, or mannitol; starches, such as corn starch and the like, various organic acids, such as citric, malic and acetic acids; various natural products containing carbohydrates, such as corn steep liquor, soybean meal, cottonseed meal and many other available materials which have been used heretofore as a source of carbon in fermentation processes. Usually a variety of the above can be employed in the medium with good results.

Suitable sources of nitrogen may include, for example, some of the above-named materials, such as corn steep liquor, soybean meal, cottonseed meal and the like. Various other substances may be utilized, as for example, beef extract, casein, yeast, enzymatically digested proteins, and degradation products, including peptones, amino acids, and many other available proteinaceous materials which have been found to be suitable in supporting the growth of bacteria. Other organic and inorganic sources of nitrogen, including urea, ammonium salts, nitrates, and the like, also may be used in the medium as a source of assimilable nitrogen to provide a favorable growth medium for the organism.

Mineral requirements of fermentation are usually supplied in the crude materials which are often used as sources of carbon and nitrogen or occur in the water available for use in the process. However, it is usually advisable to supplement the minerals normally present with added amounts to obtain an optimal growth. Cations and anions which may be desirable in added amounts include sodium, potassium, calcium, magnesium, phosphate, sulphate, chloride, cobalt, manganese, and various others. It is often desirable, also to provide such trace elements as boron, copper, cobalt, molybdenum, chromium and the like.

Growth of the organism takes place under aerobic conditions and suitable aeration, in flasks, for example, can be achieved by agitation on a reciprocating or rotary shaker or in bottles or tanks by forcing sterile air through the fermentation mixture. In good practice, sterile air should be available in the medium in a ratio to the medium in the range of from about 1:3 to about 2:1 volumes per minute. Agitation in bottles or fermenter tanks is provided by a mechanical impeller. While the organism will grow at temperatures of 5° and 45° C., it is preferable for optimum results to carry out the process of the present invention within a somewhat more limited temperature range of from about 25° to about 37° C.

To prepare inocula, 1.0 ml. of washed vegetative cell suspension of the organism is used to inoculate 100 ml. of sterile medium in a 500 ml. Erlenmeyer flask. An illustrative medium of this type contains the following: 1% cerelose, 0.1% yeast extract (difcc), 0.4% of peptone (Bacto), sodium chloride 0.25% and beef extract (Armour) 0.4%. This mixture is sterilized for 15 minutes at a temperature of 120° C. (15 pounds steam pressure), and adjusted to about pH 7. This medium is used in the illustrative examples below. The inoculated flask is incubated at 37° C. on a shaker for about 4 to 8 hours. Such inocula may be used to inoculate larger batches of sterile medium in bottles, and such bottles cultures, after fermentation, may be used to inoculate large batches of medium infermentater tanks. This procedure is given as a typical illustration only, and may be varied if necessary or desirable. For example, instead of the broth described above, other media may be used. This will be shown in the examples hereinafter.

Typical $\Delta^4$-steroids of the pregnene series which can be usefully processed according to the present invention include for example 9α-fluoro-4-pregnene-11β-16α-17α-triol-3,20-dione and 16α-acetoxy-9α-fluoro-4-pregnene-11β,17α-diol-3,20-dione.

The amount of steroid added as substrate to the fermentation may be varied as necessary or desirable. However, a good practice will ordinarily be found on the order of about 0.05 to 1.0 gram per liter of nutrient medium.

When using such steroid substrates in the fermentation, the products formed are the free steroids. These steroids are generally added to the fermentation in solution or in finely-divided form. A preferred method is to dissolve the steroid in ethanol or other water-miscible solvents and add it to the fermentation medium at the desired stage in the process. Although the steroid may precipitate from solution when so added, it is dispersed throughout the medium as a fine suspension and becomes readily available to the organism for oxidation.

During fermentation process, it may be found desirable to add an antifoaming agent. In such cases, commercially-available products may be used. These usually contain agents such as silicones, glyceride oils, and the like. These compounds are added from time to time and in the amounts needed.

In general, practice of the process of the present invention may be illustrated by the following procedure. About 10 ml. batches of inoculated medium are placed in 100 ml. shaker tubes and incubated, usually for a period of about 16 to 40 hours, at an average temperature of about 28° C. At this point, 2 mgm. of sterile substrate (4-pregnene steroid) dissolved in 0.2 ml. of ethanol is added to each tube. Fermentation is then continued at about 28° C. for sufficient time to obtain maximum conversion of the 4-pregnene to the 1,4-pregnadiene. This period of time may vary from as little as about one hour to about 72 hours, or longer.

At the conclusion of fermentation, the product $\Delta^{1,4}$-steroid of the pregnadiene series is recovered from the fermentation medium. This may be illustrated by the following procedure, which describes in particular a 10 ml. fermentation. However, this is a general procedure, operative for fermentations of various sizes.

The contents of a fermentation tube are extracted with 3 volumes of a suitable solvent such as ethyl acetate. The solvent phase is evaporated to dryness and the residue is then dissolved in a suitable solvent such as methanol, dimethyl formamide, or mixture thereof. This solution is used for characterization of steroid content as described hereinafter.

In large-scale fermentations, the crude product or products may be recovered from the fermentation beer by simple solvent extraction, using a suitable water-immiscible solvent, such as chlorinated lower hydrocarbons, alcohols, esters, ketones, etc. Further purification and separation of steroid products from extracts may be accomplished by methods well understood by those skilled in the art. Separation and purification of a steroid mixture often requires the use of chromatography.

The process employed to identify the steroids present in the extracted fermentation beer previously described is by paper strip chromatography. A solvent system used is petroleum ether: benzene:acetic acid:p-dioxane prepared by shaking the solvents listed in the proportion 2:4:1:1 respectively in a separatory funnel and then allowing the two layers to separate. A portion of the lower layer is placed in an open dish on the floor of a large glass cylinder. The upper layer is the solvent phase and is used to fill the trough-shaped well within the cylinder. For comparison, a standard steroid solution is prepared by dissolving a known sample of steroid in methanol, dimethyl formamide, or mixtures thereof. At least one standard steroid solution is chromatographed simultaneously each time an unknown solution is tested.

Exactly 0.010 ml. of the standard steroid test solution is applied to the paper strip at the starting line, four inches from the upper end of the strip, which is folded over the edge of the trough and immersed in the solvent phase within. The strip is then developed from 2 to 4 hours.

On another strip, 0.01 ml. of the unknown solution is similarly applied and this strip is then folded into the same trough, being developed simultaneously with the steroid standard strip. This use of the trough permits the simultaneous development of many strips. After proper development of the paper strips, they are removed from the apparatus and air dried. After drying, the strips are placed between a source of ultraviolet light and a zinc silicate coated plate. Steroids containing the $\Delta^4$-3-ketone conjugated system are observed as dark spots. Strips are lined up with at least one "standard" strip and Rf determined. The different steroids can be then identified by their positions on the strips.

The desired $\Delta^{1,4}$-steroids will be more polar than their corresponding $\Delta^4$-steroid. It should be understood, moreover, that the desired $\Delta^{1,4}$-steroids, once they have been isolated and characterized, may themselves be used in a standard steroid solution for process improvement.

The present invention will be more fully described in conjunction with the following examples. They are intended as illustrations.

EXAMPLE 1

*Preparation of 9α-Fluoro-1,4-Pregnadiene-11β,16α,17α-Triol-3,20-Dione*

A test tube agar slant of *Bacterium havaniensis* (ATCC No. 4001) is washed with 7 ml. of sterile saline solution, and the resulting suspension is used to inoculate 100 ml. of sterile medium (described hereinbefore) in a 500 ml. Erlenmeyer flask. The mixture is incubated on a reciprocating shaker for about 7 hours at 37° C. One ml. portions of this culture are then used to inoculate forty-eight 100 ml. lots of sterile medium in 500 ml. flasks and the inoculated flasks incubated for about 16 hours, at about 28° C.

At this time 20 mg. of 9α-fluoro-4-pregnene-11β,16α,17α-triol-3,20-dione is dissolved in 2.0 ml. of methanol and added to each flask. The incubation is then continued for an additional 72 hours. A 5 ml. aliquot is extracted once with 15 ml. of ethyl acetate and the extract is evaporated to dryness under vacuum. The dry residue is taken up in a methanol-dimethylformamide mixture and an appropriate sample analyzed by the paper strip technique described hereinbefore. The results indicate that the solution contains principally 9α-fluoro-1,4-pregnadiene-11β,16α,17α-triol-3,20-dione.

EXAMPLE 2

Repeating the procedure used in Example 1, but substituting *Bacterium mycoides* (ATCC No. 4004) for that used therein, produced the same result as shown by chromatographic assay.

EXAMPLE 3

*Isolation from Fermentation Mash*

Four liters of whole mash as produced in Example 1 are extracted with two 4 liter portions of ethyl acetate, the extracts are pooled and the combined ethyl acetate solution is concentrated under vacuum to dryness. The dry residue is washed with about 4 ml. of ethyl acetate and a few ml. of ether to obtain 840 mg. of light brownish solid. This was chromatographed using an equilibrated solvent system comprising water, cyclohexane and dioxane (ratios 1:4:5 parts) and the major portion, as shown by ultraviolet analysis, is concentrated under reduced pressure to produce a crystalline product which is collected, washed several times with 5 ml. portions of acetone, and dried, yielding 613 mg. The product, after recrystallization from acetone-petroleum ether, has the following properties: $\lambda$ max.=239 m$\mu$; $\epsilon$=15,600; $[\alpha]_d^{25}$=+51°; M.P.=275°–279° C. which was not depressed when mixed with an authentic sample of 9α-fluoro-1,4-pregnadiene-11β,16α,17α-triol-3,20-dione from another source. The infrared spectrum is the same as that of the authentic sample.

EXAMPLE 4

*Preparation of 16α-Acetoxy-9α-Fluoro-11β-17α-Dihydroxy-1,4-Pregnadiene-3,20-Dione*

A portion of 100 mg. of 9α-fluoro-11β-16α-17α-trihydroxy-1,4-pregnadiene-3,20-dione is mixed with 2 ml. of pyridine and 1 ml. of acetic anhydride and allowed to stand over night at room temperature. The so-reacted mixture is diluted with water and the product solids are filtered off, washed with water and dried. Crystallization of these solids from an ethyl acetate-Skellysolve B mixture gave 16α-acetoxy-9α-fluoro-11β-17α-dihydroxy-1,4-pregnadiene-3,20-dione as needles (75 mg.), M.P. 242–244°.

*Analysis.*—Calculated for $C_{23}H_{29}O_6F$; C, 65.70; H, 7.65. Found: C, 65.69; H, 7.17.

We claim:

1. A process of dehydrogenating one of the group consisting of 9α-fluoro-4-pregnene-11β,16α-17α-triol-3,20-dione and the corresponding 16α-acetoxy compound which comprises the step of subjecting the steroid to the fermentative action of one of *Bacterium havaniensis* and *Bacterium mycoides*.

2. A process which comprises the step of subjecting one of the group consisting of 9α-fluoro-4-pregnene-11β,16α,17α-triol-3,20-dione and the corresponding 16α-acetoxy compound to the fermentative action of *Bacterium mycoides* and recovering therefrom the corresponding 1,4-pregnadiene.

3. A process for the production of 1,4-pregnadienes which comprises contacting in an aqueous medium under submerged fermentation conditions, one of the group consisting of 9α-fluoro-4-pregnene-11β,16α,17α-triol-3,20-dione and the corresponding 16α-acetoxy compound with the dehydrogenating activity of *Bacterium havaniensis*.

4. A process which comprises: inoculating a nutrient medium containing assimilable carbon, nitrogen and mineral salts with one of *Bacterium havaniensis* and *Bacterium mycoides* adding one of the group consisting of 9α-fluoro-4-pregnene-11β,16α,17α-triol-3,20-dione and the corresponding 16α-acetoxy compound continuing the resultant fermentative action on the steroid until a substantial amount of corresponding $\Delta^{1,4}$-steroid of the pregnadiene series has been produced, and recovering said product therefrom.

5. A process according to claim 4 using *Bacterium havaniensis*, ATCC No. 4001.

6. A process according to claim 5 in which the substrate steroid is one of 9α-fluoro-4-pregnene-11β,16α,17α-triol-3,20-dione and the corresponding 16α-acetoxy compound and the recovered product is 9α-fluoro-1,4-pregnadiene-11β,16α,17α-triol-3,20-dione.

7. A process according to claim 4 using *Bacterium mycoides*, ATCC No. 4004.

8. A process according to claim 7 in which the substrate steroid is one of 9α-fluoro-4-pregnene-11β,16α,17α-triol-3,20-dione and the corresponding 16α-acetoxy compound and the recovered product is 9α-fluoro-1,4-pregnadiene-11β,16α,17α-triol-3,20-dione.

References Cited in the file of this patent

UNITED STATES PATENTS

| | | |
|---|---|---|
| 2,793,164 | Fried et al. | May 21, 1957 |
| 2,844,513 | Wettstein et al. | July 22, 1958 |
| 3,016,335 | Stoudt | Jan. 9, 1962 |

OTHER REFERENCES

Prescott et al.: Industrial Microbiology, McGraw-Hill Book Co., Inc., 1959, pages 725, 726 and 749.

Bergey's Manual, 6th ed., Williams and Wilkins Co., 1948, pages 915 and 918.

Bergey's Manual, 7th ed., Williams and Wilkins Co., 1957, page 1018.